United States Patent [19]

Heffernan

[11] 4,309,200
[45] Jan. 5, 1982

[54] BAGHOUSE WITH COLLAPSIBLE BAG FILTER ASSEMBLY

[75] Inventor: Cathy A. Heffernan, Andover, N.Y.

[73] Assignee: The Air Preheater Company, Inc., Wellsville, N.Y.

[21] Appl. No.: 183,506

[22] Filed: Sep. 2, 1980

[51] Int. Cl.³ .............................................. B01D 46/02
[52] U.S. Cl. ................................ 55/341 NT; 55/378; 55/422; 55/481
[58] Field of Search .............. 55/341 R, 341 NT, 378, 55/422, 481

[56] References Cited

U.S. PATENT DOCUMENTS

| 1,761,377 | 6/1930 | Waring | 55/378 X |
| 1,776,805 | 9/1930 | Bragstad | 55/422 X |
| 1,797,812 | 3/1931 | Waring | 55/341 NT X |
| 3,788,046 | 1/1974 | Kaeppler et al. | 55/341 R |
| 3,992,177 | 11/1976 | Welteroth | 55/341 NT X |

FOREIGN PATENT DOCUMENTS 374883  5/1923  Fed. Rep. of Germany ........ 55/341 NT

*Primary Examiner*—Kathleen J. Prunner
*Attorney, Agent, or Firm*—William W. Habelt

[57] ABSTRACT

A baghouse filter apparatus including a collapsible bag filter assembly (20) for separating from a gas solid particles entrained therein. The collapsible bag filter assembly comprises a plurality of fabric filter bags (22) extending between a grid sheet (26) and a tube sheet (24) with at least one sheet being movable toward the other sheet and the other sheet being slidably mounted on rails (42). Legs (40) are provided to guide the movement of the one sheet toward the other so as to keep the grid sheet and tube sheet parallel and properly aligned as the bag filter assembly is collapsed. Once the assembly is collapsed, it may be easily slid out of the baghouse (10) through an access opening (30) in the baghouse to facilitate inspection, repair, and bag removal at a location external of the baghouse.

7 Claims, 3 Drawing Figures

BAGHOUSE WITH COLLAPSIBLE BAG FILTER ASSEMBLY

BACKGROUND OF THE INVENTION

The present invention relates to baghouse filters for cleaning a gas by separating from the gas solid particles entrained therein and, more specifically, to a baghouse filter incorporating a collapsible filter bag assembly which is readily removable out of the baghouse to permit inspection, repair, and replacement of the bag filter assembly or the filter bags associated therewith to take place externally of the baghouse.

A typical baghouse filter is constructed of a plurality of filter bags suspended in an enclosure termed a baghouse. Each filter bag is a cylindrically elongated porous fabric member having an open end which is attached to a tube sheet. The filter bags and the tube sheet divide the baghouse into two chambers, one chamber comprising the space external to the bags and the other comprising the space internal to the bags.

In operation a dirty gas, i.e., a gas laden with entrained solid particles, is drawn through the baghouse. Entering through one chamber as dirty gas, the gas passes through the fabric filters to leave through the other chamber as a clean gas. As the gas flows through the fabric, the entrained solid particles being too large to pass through the pores of the fabric, collect on the surface of the fabric and are thereby filtered from the gas. In many cases, the filter bags are exposed to a very hostile environment. It is not uncommon for the gas being cleaned to have a temperature of 150° C. or more and contain corrosive compounds such as acid mist. Consequently, the fabric of the filter bags is subject to tearing and erosion resulting in a hole in the bag through which dirty gas can pass into the clean gas and thereby reduce dust collection efficiency. In order to avoid this most undesirable occurrence, it is customary to frequently visually inspect the filter bags for tears or holes in the fabric. If this examination takes place inside the baghouse, the inspection personnel are exposed to a hot, dust laden, poorly-ventilated environment and generally must perform the work in very cramped space. Typically, inspection personnel must walk along a catwalk-like structure disposed permanently within the baghouse in order to reach each of the numerous filter bags.

The desirability of being able to inspect and replace filter bags at a location external to the baghouse has been long recognized. One bag filter system which allows external access to the filter bags is disclosed in U.S. Pat. No. 3,486,310. Shown therein is a bag filter unit comprising a plurality of bags mounted to a rotating tube sheet. In order to replace the filter bags, the tube sheet is progressively rotated so that each filter bag in turn appears before an access opening thereby enabling personnel located outside of the baghouse enclosure to reach each bag. Unfortunately, such an arrangement precludes arranging the bags in a compact design. As baghouses, even when compactly designed, generally require more space than other dust collection equipment, such a limitation is a serious drawback.

Another prior art scheme designed to permit external inspection of the filter bags is the removable bag filter unit disclosed in U.S. Pat. No. 3,788,046. As disclosed therein, the entire bag filter unit is mounted on wheels so that it may be removed from the baghouse enclosure for inspection. Since filter bags may typically range in length from three meters to upwards of eight meters, a bag filter unit is of necessity quite tall. Thus, a very large access opening, which must be sealed against gas leakage, must be provided in the wall of the baghouse enclosure in order to remove the bag filter unit. Further, sufficient space must be allotted outside of the enclosure to allow removal of the bag filter unit and permit placement of access platforms about the removed unit.

Therefore, there is evidenced the need for a baghouse design which permits external inspection of the filter bag assembly while at the same time allowing for a compact, space-saving design. Accordingly, it is an object of the present invention to provide a unique bag filter assembly which, while being readily removable from the baghouse enclosure, minimizes the space requirements necessary for such removal and for the subsequent inspection process to take place.

SUMMARY OF THE INVENTION

The present invention contemplates a bag filter assembly, formed of a tube sheet, a grid sheet, and a plurality of fabric filter bags extending therebetween, which is collapsible to permit ready removal of the assembly from the baghouse for inspection and replacement of the filter bags.

In accordance with the present invention, the collapsible bag filter assembly comprises a plurality of fabric filter bags extending between a grid sheet and a tube sheet with at least one sheet being movable with respect to the other sheet. The tube sheet and the grid sheet are disposed within the baghouse assembly in spaced relationship and parallel to each other. The tube sheet is disposed within the housing so as to define a dirty gas chamber on one side of the sheet and a clean gas chamber on the other side of the sheet. A plurality of openings are provided in the tube sheet to permit the flow of gas from the dirty gas chamber into the clean gas chamber.

A plurality of elongated filter bags extend between the tube sheet and the grid sheet to form in combination therewith the bag filter assembly. Each of the filter bags has a closed end which is secured to the grid sheet and an open end which is mounted to an opening in the tube sheet. The fabric filter bags thus provide a porous interface which the particle-laden gas must traverse in passing from the dirty gas chamber to the clean gas chamber. As the gas traverses this interface, particles entrained in the gas which are too large to pass through the fabric collect thereon.

Guide means are provided within the housing for guiding the movement of at least one of the sheets, i.e., either the grid sheet or the tube sheet, toward the other thereby permitting the bag filter assembly to be collapsed. Once the assembly is collapsed, it may be easily removed through an access opening provided in the housing.

DESCRIPTION OF THE PREFERRED EMBODIMENT

Figure 1:
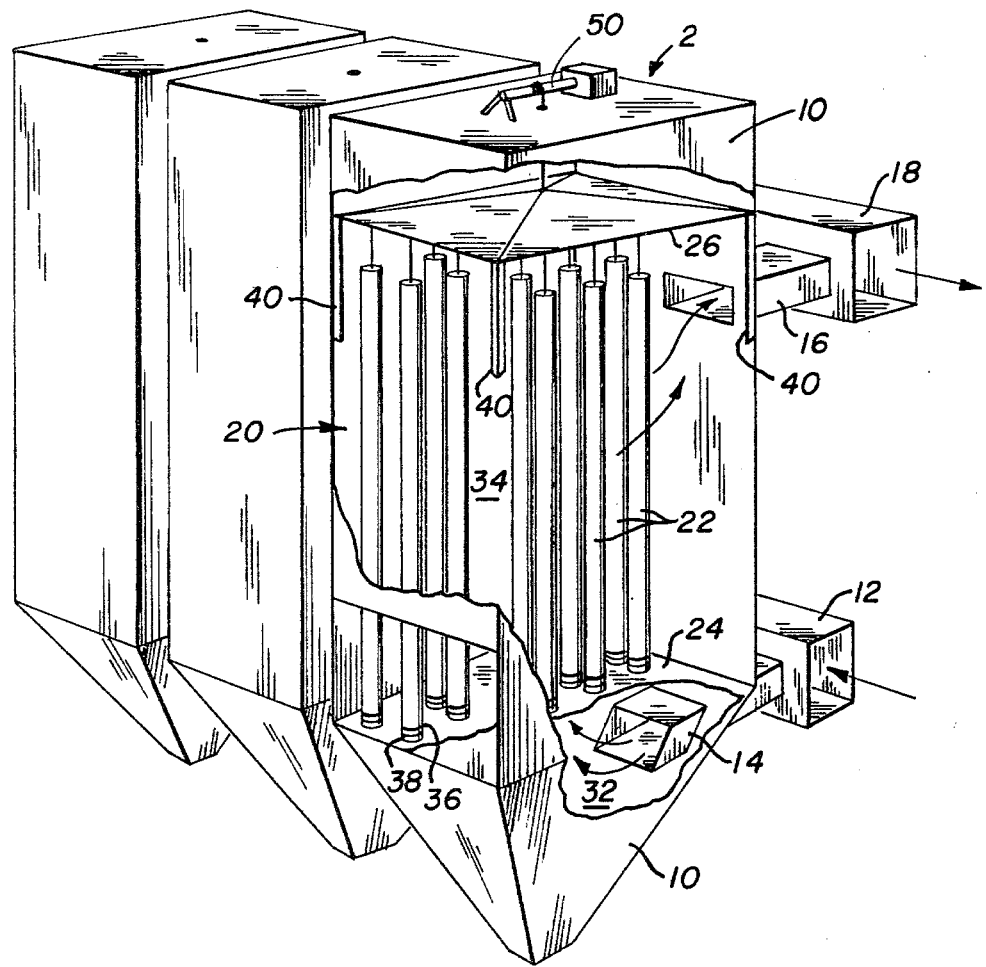
FIG. 1 is a perspective view of a baghouse installation with a portion of the housing at one baghouse cut away to show the collapsible bag filter assembly of the present invention.

Referring now to the drawing, and more particularly to FIG. 1 thereof, there is illustrated a gas cleaning installation consisting of three individual gas filters 2 termed the baghouses. However, a typical baghouse installation may range from a single baghouse to ten or more baghouses interconnected by a gas distribution system. Baghouse installations are commonly used to clean particle-laden gas from furnaces, kilns, and other industrial equipment before the gas is released to the atmosphere.

In a typical baghouse installation, particle-laden gas would be supplied to the baghouse installation through a main inlet duct 12 and enter the individual baghouses 2 through inlet ducts 14. Each inlet duct 14 penetrates the housing 10 of the baghouse and opens into a filter chamber defined within the interior thereof. The dirty gas leaving the gas inlet duct 14 passes through the bag filter assembly 20 disposed in the filter chamber and leaves the baghouse as clean gas through outlet duct 16 which penetrates the housing 10 and connects to main outlet duct 18. In traversing the bag filter assembly 20, entrained particles which are too large to pass through the fabric mesh collect on the filter bags 22 and are thereby removed from the gas.

A tube sheet 24 is disposed within the filter chamber defined by the housing 10 so as to divide the filter chamber into a dirty gas chamber 32 and a clean gas chamber 34. Tube sheet 24 has a plurality of openings therein which provide gas flow communication between the dirty gas chamber 32 and the clean gas chamber 34. A grid sheet 26 is disposed parallel to and in spaced relationship from the tube sheet 24.

Extending between the tube sheet 24 and the grid sheet 26 are a plurality of elongated fabric filter bags 22. Each of the filter bags 22 is a generally tubular member of porous fabric material having an open end and a closed end. The open end of each bag is mounted to an opening in the tube sheet 24 typically by means of a clamp 36 which secures the bag 22 to a nipple 38 formed around the opening in the tube sheet 24. In passing from the dirty gas chamber 32 through the openings in the tube sheet 24 into the clean gas chamber 34, the particle-laden gas must necessarily traverse the porous interface provided by the fabric filter bags 22. In this process, many of the solid particles entrained in the gas are removed therefrom.

The filter bags 22 in combination with the tube sheet 24 and the grid sheet 26 form the bag filter assembly 20. In accordance with the present invention, the bag filter assembly 20 is made collapsible by providing that at least one of the sheets is movable with respect to the other. When it is desired to inspect the fabric bags 22 or other parts of the assembly, the bag filter assembly 20 is collapsed to a significantly-reduced height either by moving the grid sheet 26 towards the tube sheet 24 as shown in FIG. 2, or by moving the tube sheet 24 towards the grid sheet 26 as shown in FIG. 3.

Guide means 40 are provided within the housing 10 for guiding the movement of one of the sheets toward the other thereby permitting the bag filter assembly 20 to be collapsed. The guide means 40 function to keep the grid sheet 26 and the tube sheet 24 in parallel relationship as the assembly is collapsed. Additionally, the guide means 40 may be cut to a preselected length to provide a predetermined spacing between the grid sheet 26 and the tube sheet 24 of the collapsed bag filter assembly.

Once the bag filter assembly 20 has been collapsed, it may be easily removed from the baghouse 2 through an access opening 30 in the housing 10. The access opening 30 must be sealable when the baghouse is in operation to prevent dust leakage. Accordingly, a door 60 is provided to seal the access opening 30 when the door 60 is in the closed position.

Figure 2:
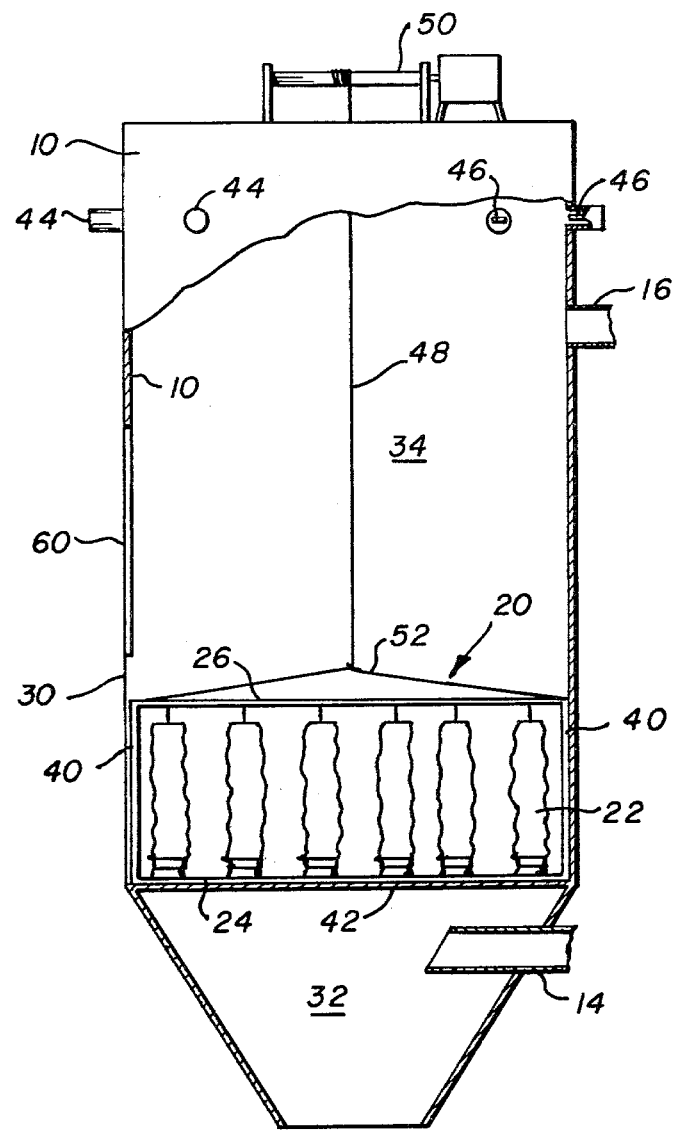
FIG. 2 is a sectional elevation view of a preferred embodiment of the collapsible bag filter assembly of the present invention in the collapsed state.
Figure 3:
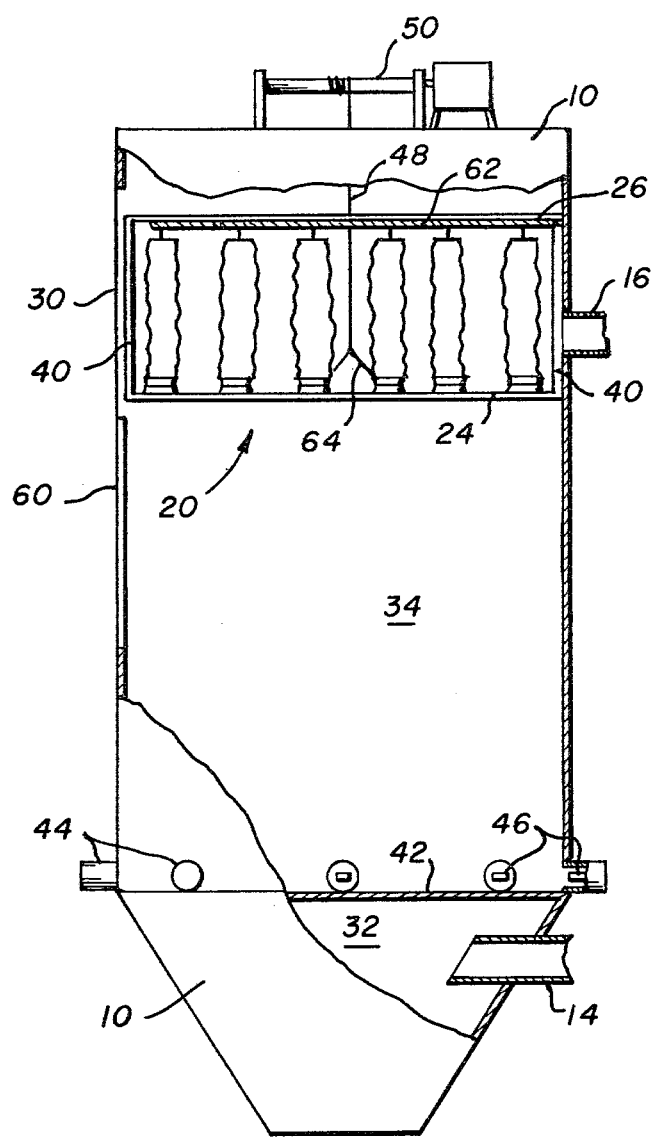
FIG. 3 is a sectional elevation view of an alternate embodiment of the collapsible bag filter assembly of the present invention in the collapsed state.

Referring now to FIG. 2, there is shown therein the preferred embodiment of the present invention wherein the bag filter assembly 20 is collapsed by moving the grid sheet 26 toward the tube sheet 24. The tube sheet 24 is slidably mounted within the housing 10 on support rails 42 so that it can be slid out of the housing 10 through the access opening 30 but otherwise be held stationary with respect to the housing.

When the bag filter assembly 20 is in its normal operational state, i.e., uncollapsed, the grid sheet 26 is supported and held in position by releasable support means 44 mounted to the housing 10. While as shown as pneumatically-activated retractable support tabs 46, it is within the scope of the invention to utilize any of a number of well-known releasable supports instead of the pneumatically-activated retractable support tabs 46.

In order to collapse the bag filter assembly 20, a cable 48 from a winch 50, which may be portable or permanently mounted on the roof of the housing 10, is lowered through a suitable opening in the roof of the housing 10 and attached to the grid sheet 26, or preferably to a hanger assembly 52 permanently mounted to the grid sheet 26. The releasable support means 44 are then released thereby allowing the grid sheet 26 to become freely movable within the housing 10. The winch 50 is activated to slowly move the grid sheet 26 toward the tube sheet 24.

In this embodiment, the guide means are comprised of a plurality of legs 40 extending perpendicularly outward from the grid sheet 26 toward the tube sheet 24. The legs 40 abut the inside of the housing 10 thereby assuring that the grid sheet 26 and the tube sheet 24 remain parallel and in proper alignment as the bag filter assembly 20 is collapsed. The grid sheet 26 is moved toward the tube sheet 24 until the outward ends of the legs 40 make contact with the tube sheet 24. The length of the legs 40 is preselected to provide a predetermined spacing between the grid sheet 26 and the tube sheet 24 when the bag filter assembly is collapsed.

Once the bag filter assembly 20 is collapsed, access door 60 is opened and the collapsed bag filter assembly 20 may be slid out of the baghouse through the access opening 30 in the lower portion of the housing 10. Thus, the bag filter assembly is readily made available for inspection and replacement of the filter bags 22 at a location external of the baghouse.

Referring now to FIG. 3, there is shown therein an alternate embodiment of the present invention wherein the bag filter assembly 20 is collapsed by moving the tube sheet 24 toward the grid sheet 26. The grid sheet 26 is slidably mounted within the housing 10 on support rails 62 so that it can be slid out of the housing 10 through the access opening 30 but otherwise be held stationary with respect to the housing.

When the bag filter assembly 20 is in its normal operational state, i.e., uncollapsed, the tube sheet 24 is supported and held in position by releasable support means 44 mounted to the housing 10. Although shown as pneumatically-activated retractable support tabs 46, it is within the scope of the invention to utilize any of a number of well-known releasable supports instead of the pneumatically-activated retractable support tabs 46.

In order to collapse the bag filter assembly 20, a cable 48 from a winch 50, which may be portable or permanently mounted on the roof of the housing 10, is lowered through a suitable opening in the roof of the housing 10 and attached to the tube sheet 24, or preferably to a hanger assembly 64 permanently mounted to the tube sheet 24. Support means 44 are then released thereby allowing the tube sheet 24 to become freely movable within the housing 10. The winch 50 is then activated to slowly move the tube sheet 24 toward the grid sheet 26.

In this embodiment, the guide means are comprised of a plurality of legs 40 extending perpendicularly outward from the tube sheet 24 toward the grid sheet 26. The legs 40 abut the inside of the housing 10 thereby assuring that the tube sheet 24 and the grid sheet 26 remain parallel and in proper alignment as the bag filter assembly 20 is collapsed. The tube sheet 24 is moved toward the grid sheet 26 until the outboard ends of the legs 40 make contact with the grid sheet 26. The length of the legs 40 is preselected to provide a predetermined spacing between the grid sheet 26 and the tube sheet 24 when the bag filter assembly is collapsed.

Once the bag filter assembly 20 is collapsed, access door 60 is opened; and the collapsed bag filter assembly 20 may be slid out of the baghouse through the access opening 30 in the upper portion of the housing 10. Thus, the bag filter assembly is readily made available for inspection and replacement of the filter bags 22 at a location external of the baghouse.

Thus, in accordance with the present invention there has been provided a novel bag filter assembly which readily permits external inspection of the filter bags. Because of the collapsible nature of the bag filter assembly of the present invention, the amount of space which must be allowed for removal of the assembly from the baghouse and for the subsequent inspection process to take place is minimized. The bag filter assembly can be collapsed to such a height as to permit the inspection personnel to remove and replace the filter bags without having to climb on ladders or scaffolding to do so. Additionally, the headroom which must be provided in the vicinity of the baghouse to permit removal of the bag filter assembly and the subsequent inspection to take place is minimal.

It will be appreciated that modifications to the embodiments of the invention which have been shown may be readily made by those skilled in the art. For instance, one might modify the present invention by providing an access door in the roof of the baghouse housing rather than in the sidewall thereof as shown in the drawing. The collapsed assembly could then be withdrawn through the roof of the baghouse housing. It is intended by the appended claims to cover this and other modifications alluded to herein as well as all other modifications which may fall within the spirit and scope of the invention.

I claim:

1. A filter apparatus for cleaning a gas laden with solid particles comprising:
  a. a housing defining a filter chamber therein;
  b. a tube sheet having a plurality of openings therein disposed within said housing so as to divide the filter chamber into a dirty gas chamber and a clean gas chamber;
  c. a grid sheet disposed within said housing in spaced relationship from and parallel to said tube sheet;
  d. a plurality of elongated fabric filter bags extending between said tube sheet and said grid sheet, said filter bags in combination with said tube sheet and said grid sheet forming a bag filter assembly, each of said filter bags having an open end and a closed end, the open end of each bag mounted to an opening in said tube sheet and the closed end of each bag secured to said grid sheet, said plurality of fabric filter bags thereby providing a porous interface which the particles-laden gas must traverse in passing from the dirty gas chamber to the clean gas chamber;
  e. guide means disposed within said housing for guiding the movement of at least one of said sheets toward the other thereby permitting the bag filter assembly to be collapsed;
  f. an access opening in said housing through which the collapsed bag filter assembly may be removed;
  g. an access door for sealing said access opening when said access door is in the closed position; and
  h. releasable support means operatively associated with said one of said sheets for supporting said one sheet in spaced relationship from the other sheet, said one sheet being freely movable toward the other sheet to collapse the bag filter assembly upon release of said support means, the other sheet being slidably mounted but otherwise held stationary within said housing so that the collapsed bag filter assembly can be slidably withdrawn from said housing through said access opening.

2. A filter apparatus as recited in claim 1 wherein said releasable support means supports said grid sheet in spaced relationship from said tube sheet, said grid sheet being freely movable toward said tube sheet when said support means are released thereby permitting the bag filter assembly to be collapsed and said tube sheet being slidably mounted but otherwise held stationary within said housing.

3. A filter apparatus as recited in claim 2 wherein said guide means comprises a plurality of legs extending perpendicularly from said grid sheet in the direction of said tube sheet, said legs mounted to said grid sheet along the edges thereof so as to abut the housing.

4. A filter apparatus as recited in claim 3 wherein the length of said legs is preselected to provide a predetermined spacing between said grid sheet and said tube sheet of the collapsed bag filter assembly.

5. A filter apparatus as recited in claim 1 wherein said releasable support means supports said tube sheet in spaced relationship from said grid sheet, said tube sheet being freely movable toward said grid sheet when said support means are released thereby permitting the bag filter assembly to be collapsed and said grid sheet being slidably mounted but otherwise held stationary within said housing.

6. A filter apparatus as recited in claim 5 wherein said guide means comprises a plurality of legs extending perpendicularly from said tube sheet in the direction of said grid sheet, said legs mounted to said tube sheet along the edges thereof so as to abut the housing.

7. A filter apparatus as recited in claim 6 wherein the length of said legs is selected to provide a predetermined spacing between said grid sheet and said tube sheet of the collapsed bag filter assembly.

* * * * *